(12) United States Patent
Peterson

(10) Patent No.: US 11,201,463 B2
(45) Date of Patent: Dec. 14, 2021

(54) INDUCTOR DISCHARGE TECHNIQUES FOR SWITCH CONTROLLER

(71) Applicant: Analog Devices International Unlimited Company, Limerick (IE)

(72) Inventor: Karl David Peterson, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 85 days.

(21) Appl. No.: 16/822,740

(22) Filed: Mar. 18, 2020

(65) Prior Publication Data
US 2021/0296887 A1 Sep. 23, 2021

(51) Int. Cl.
*H02H 9/00* (2006.01)
*H02H 1/00* (2006.01)

(52) U.S. Cl.
CPC .......... *H02H 9/002* (2013.01); *H02H 1/0007* (2013.01)

(58) Field of Classification Search
CPC ............................................. H02H 9/001–002
See application file for complete search history.

(56) References Cited

U.S. PATENT DOCUMENTS

| | | | |
|---|---|---|---|
| 5,311,069 A | | 5/1994 | Austin |
| 5,977,756 A | | 11/1999 | Nagata et al. |
| 6,163,142 A | * | 12/2000 | Tsujimoto ........... H02M 3/1582 323/283 |
| 6,188,211 B1 | | 2/2001 | Rincon-Mora et al. |
| 6,307,376 B1 | | 10/2001 | Alexander et al. |
| 6,545,513 B2 | | 4/2003 | Tsuchida et al. |
| 7,812,647 B2 | | 10/2010 | Williams |
| 7,889,011 B2 | | 2/2011 | Nyboe et al. |
| 7,932,754 B1 | | 4/2011 | Broach et al. |
| 8,278,901 B2 | | 10/2012 | Noda |
| 8,624,640 B2 | | 1/2014 | Mori et al. |
| 10,084,402 B2 | | 9/2018 | Saw et al. |
| 2007/0085520 A1 | * | 4/2007 | Ho ...................... H02M 3/1588 323/282 |
| 2012/0007637 A1 | | 1/2012 | Fukuda |
| 2019/0280638 A1 | | 9/2019 | Saito et al. |

FOREIGN PATENT DOCUMENTS

| | | |
|---|---|---|
| DE | 10154814 A1 | 5/2003 |
| WO | WO-2018079127 A1 | 5/2018 |

OTHER PUBLICATIONS

"TPS2320-2321: Dual Hot Swap Power Controllers with Independent Circuit Breaker", Texas Instruments Data Sheet, (2013), 27 pgs.

* cited by examiner

*Primary Examiner* — Jared Fureman
*Assistant Examiner* — Christopher J Clark
(74) *Attorney, Agent, or Firm* — Schwegman Lundberg & Woessner, P.A.

(57) ABSTRACT

Techniques are described to slow the turn off of a pass transistor coupled to an inductive load and being controlled by a hot swap or switch controller in the event of a fault on the load side. Active circuitry can control the gate of the pass transistor, e.g., field-effect transistor (FET), as the inductive load de-energizes and a feedback loop can servo the gate voltage of the pass transistor in order to ensure that its source does not go below a reference voltage.

20 Claims, 4 Drawing Sheets

INDUCTOR DISCHARGE TECHNIQUES FOR SWITCH CONTROLLER

FIELD OF THE DISCLOSURE

This disclosure relates generally to a controller device for enabling power to be supplied to an electrical load.

BACKGROUND

There are instances when it is desired to connect an electrical load to a live electrical power source or power supply (either AC or DC) that is already on. This can give rise to large in-rush currents as capacitive components of the load charge up. Such capacitive components may be real or parasitic components. These in-rush currents can perturb the operation of the source and the load, possibly causing protective measures within the circuit to trip. In addition, a fault such as a short circuit, occurring after power-up and during operation, can damage components. In order to address these issues, "hot swap" or load switch controller circuits can regulate or limit the current flow either to a load that is newly introduced to a power supply or to a fault.

SUMMARY OF THE DISCLOSURE

This disclosure describes, among other things, techniques to slow the turn off of a pass transistor coupled to an inductive load and being controlled by a hot swap or switch controller in the event of a fault on the load side. As described in detail below, active circuitry can control the gate of the pass transistor, e.g., field-effect transistor (FET), as the inductive load de-energizes and a feedback loop can servo the gate voltage of the pass transistor in order to ensure that its source does not go below a reference voltage.

In some aspects, this disclosure is directed to a device for controlling a pass transistor between a power supply and an inductive load, the device comprising: a pin configured to couple to the pass transistor; a sensing circuit configured to couple to an input voltage and to measure a representation of current to the inductive load; a control circuit configured to couple to the sensing circuit and the pass transistor, the control circuit configured to control the pass transistor between ON and OFF states; a clamp circuit configured to: monitor a voltage at an output node; and in response to the monitored voltage at the output node exceeding a magnitude of a reference voltage, control a rate at which the pass transistor turns OFF.

In some aspects, this disclosure is directed to a method of controlling a pass transistor between a power supply and an inductive load, the method comprising: measuring a representation of a current to the inductive load; monitoring a voltage at an output node; and in response to detecting a fault at the inductive load using the representation of the current and in response to the monitored voltage at the output node exceeding a reference voltage, decreasing a rate at which the pass transistor turns OFF.

In some aspects, this disclosure is directed to a device for controlling a pass transistor between a power supply and an inductive load, the device comprising: means for monitoring a voltage at an output node; and in response to detecting a fault at the inductive load using a representation of a current to the inductive load and in response to the monitored voltage at the output node exceeding a reference voltage, means for decreasing a rate at which the pass transistor turns OFF.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

When an inductive load is driven by a hot-swap or load switch controller and the load is switched off, the energy stored in the inductance of the load will have the tendency to pull the output node down until the inductive load can be de-energized. If the load is switched off due to a fault, such as a short-circuit, there may be substantial current flowing through the inductive load and nothing to dissipate the energy on the load side. In the absence of a clamping mechanism, the output node can be pulled far below the local ground potential, which can damage the controller.

This disclosure describes techniques to slow the turn off of a pass transistor coupled to an inductive load and being controlled by a hot swap or switch controller in the event of a fault on the load side. As described in detail below, active circuitry can control the gate of the pass transistor, e.g., field-effect transistor (FET), as the inductive load de-energizes and a feedback loop can servo the gate voltage of the pass transistor in order to ensure that its source does not go below a reference voltage.

Figure 1:
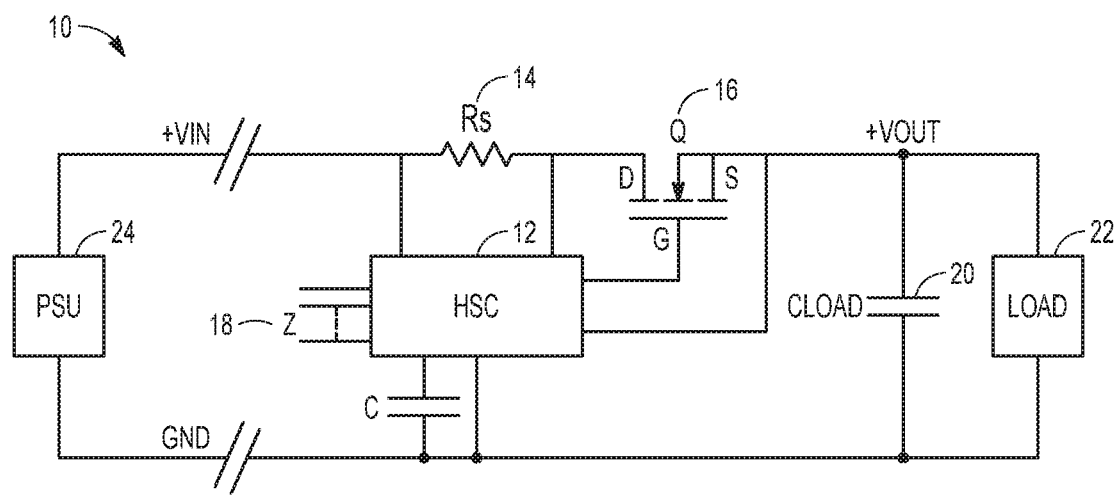
FIG. 1 is a diagram of an example of a hot swap circuit.

FIG. 1 is a diagram of an example of a hot swap circuit. A hot swap circuit 10 can include a controller 12 (HSC), a current sense element 14 (RS), a pass transistor 16 (Q), e.g., field-effect transistor (FET), a number of discrete components 18 (Z) coupled to a power supply unit (PSU) 24.

With the controller 12, the current sense element 15 can form part of a sensing circuit that is configured to couple to an input voltage VIN and measure a representation of current to the load. The main function of the controller 12 can be to detect the current in the sense element 14 and control the pass transistor 16 to ensure that the current does not exceed the system limits and/or the safe operating limits of the pass transistor 16. The latter can be achieved using a timer function that limits the amount of time the system can remain in current limit. At the output of the hot swap circuit 10, there is usually a significant amount of load capacitance 20 (CLOAD).

The controller 12 can include a control circuit coupled to the sensing circuit and the pass transistor 16 that can control the pass transistor to operate between ON and OFF states. For example, the controller 12 can apply a control signal to the pass transistor 16, e.g., to a gate of the FET 16, in order to control a current flow to the load 22. The controller 12 can monitor the voltage drop across the current sensing resistor 14 and, in a closed loop, can control the pass transistor 16, e.g., the gate voltage of the FET 16, such that the rate of change of current (dI/dt) is controlled to a target value, the magnitude of the current is controlled to a target value, or the output voltage ramp is controlled to a target value. This can prevent excessive in-rush currents being drawn by the load 22. The load 22 can be assumed to be fully powered when it is no longer possible to get the rate of current increase or the current to attain the target value.

The primary function of the hot swap circuit 10 is to protect the power source, hardware components (PCB, FETs, conductor, magnetics, etc.) and the entire system from damage and disturbance during fault conditions. Some of the primary protection functions can include controlling power-ups e.g., limiting in-rush current, detecting faults and over current events and interrupting them, and controlling the dV/dt of the output voltage ramp.

Figure 2:
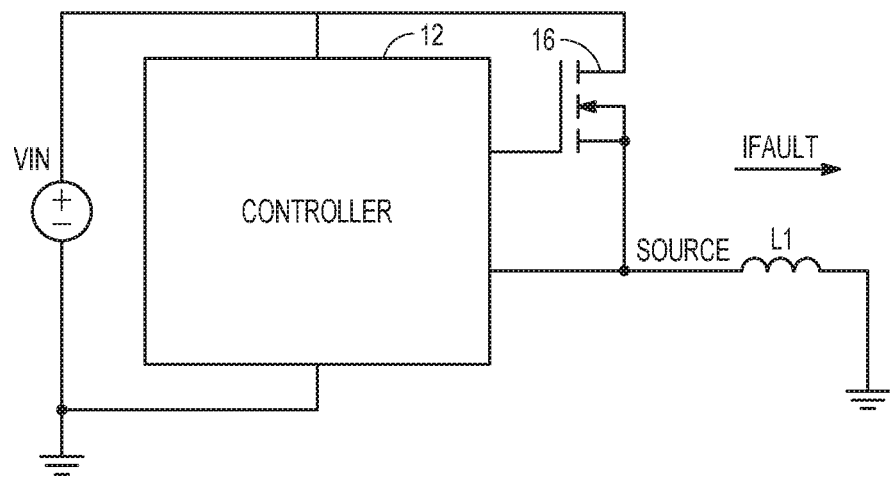
FIG. 2 is a simplified diagram of an example of a hot swap circuit coupled to an inductive load with a fault.

FIG. 2 is a simplified diagram of an example of a hot swap circuit coupled to an inductive load with a fault. When an inductive load L1 is driven by a hot-swap or load switch controller 12 and the inductive load L1 is switched off, the energy stored in the output inductance of the inductive load L1 will have the tendency to pull the output node ("SOURCE") down until the inductive load L1 can be de-energized. If the inductive load L1 is switched off due to a fault, such as a short-circuit, there may be substantial current IFAULT flowing through the inductive load L1 and nothing to dissipate the energy on the load side. In the absence of a clamping mechanism, the output node ("SOURCE") can be pulled far below the local ground potential.

Figure 3:
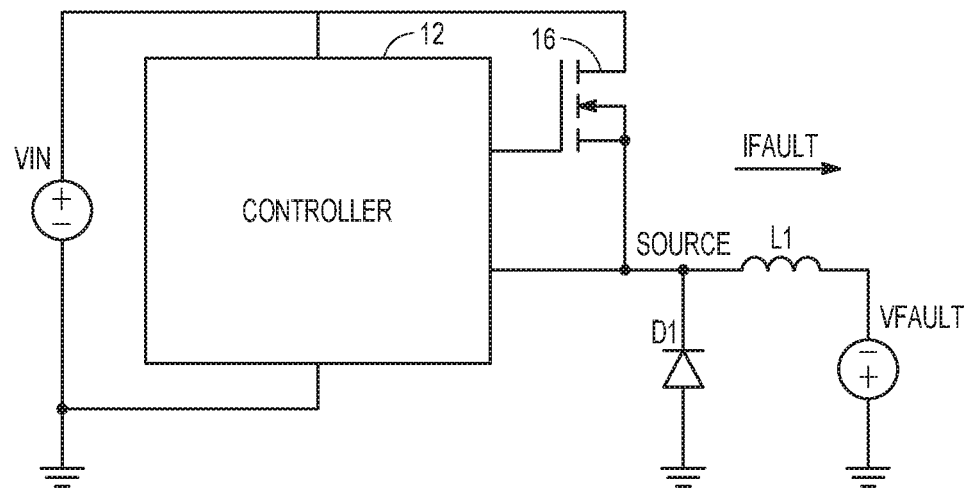
FIG. 3 is a simplified diagram of another example of a hot swap circuit coupled to an inductive load with a fault.

FIG. 3 is a simplified diagram of another example of a hot swap circuit coupled to an inductive load with a fault. The hot-swap or load switch controller 12 that drives the pass transistor 16 generally has limitations in the magnitude of negative voltages it can tolerate at the gate or source pins without malfunction or damage. In the example shown in FIG. 3, a diode D1 can be electrically coupled between the output ("SOURCE") node and ground to dissipate the inductor L1 energy while limiting the negative excursion of the voltages to which the driver is exposed.

Including the diode D1 in the manner shown in FIG. 3 can be undesirable for several reasons. The diode D1 is an additional component, with constraints on power handling and speed. The diode D1 should be robust enough to safely dissipate the residual energy in the inductor L1, which may be substantial. The diode D1 should also have dynamic turn-on characteristics that prevent negative transient under-shoots that can damage the driver circuitry. An additional disadvantage arises if the controller 12 is required to limit or block current in the case of a fault to a voltage that is lower than the local ground potential. This voltage is shown in FIG. 3 as VFAULT. If the voltage VFAULT is greater in magnitude than the voltage of the diode D1, then the current into the fault will not be limited and the diode or in-line conductors can be damaged.

The present inventor has recognized the need to ensure that the output node ("SOURCE") does not get pulled below a reference voltage when a fault occurs. The voltage at the source is ultimately a function of rate of change of current (dI/dt) in the inductor (V=L*dI/dt). In order to discharge the inductor quickly, it can be desirable for the voltage at the source to go as low as possible. However, to protect the hot swap device, the device can be designed to restrict how low the output node can be permitted to go. For example, there can be device restrictions on how low a fault to tolerate.

As described in detail below, the present inventor has recognized that a feedback loop can be used to control a control node of a pass transistor, e.g., a gate of a FET, after a fault is detected as the inductor at the output de-energizes and dissipates its residual energy. The feedback loop can servo the voltage at the control node, such as the voltage at the gate of the FET, to regulate an output voltage, such as the voltage at the source of the FET. For example, the feedback loop can monitor the source voltage relative to a reference voltage and turn off the FET at a controlled rate to servo the source to the reference voltage.

The techniques of this disclosure can produce a response that de-energizes the inductor coupled to the output of the hot swap controller as quickly as possible while limiting the quantity known at design time—its negative voltage capability—while adapting to elements of the system that may not be known at design time, such as the inductance of the load, the properties of the FET, the nature of the fault, etc.

Figure 4:
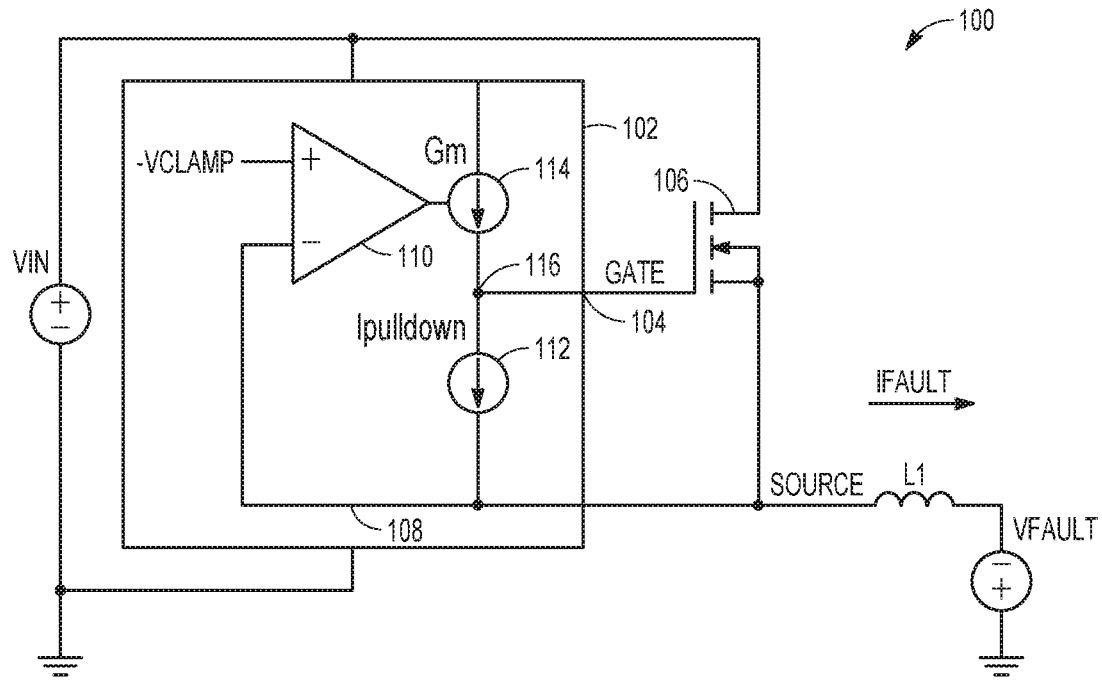
FIG. 4 is a simplified diagram of an example of a device having a feedback loop and coupled to an inductive load with a fault that can implement various techniques of this disclosure.

FIG. 4 is a simplified diagram of an example of a device 100 having a feedback loop and coupled to an inductive load with a fault that can implement various techniques of this disclosure. The device 100 can include a hot-swap or load switch controller 102 that can include a pin 104 that can be coupled to a pass transistor 106, e.g., a FET, such as an N-type or P-type FET. In some examples, the pass transistor 106 can be external to the hot-swap controller 102. In other examples, the pass transistor 106 can be a component internal to the hot-swap controller 102.

Like FIG. 1, the hot-swap controller 102 along with a current sense element, such as the current sense element 15 of FIG. 1, can form part of a sensing circuit that is configured to couple to an input voltage VIN and measure a representation of current to the inductive load. Also like FIG. 1, the hot-swap controller 102 can include a control circuit configured to couple to the sensing circuit and the pass transistor 106 and control the pass transistor 106 to operate between ON and OFF states. For example, the hot-swap controller 102 can apply a control signal to the pass transistor 106, e.g., to the gate of the FET, in order to control a current flow to the load L1.

In accordance with various techniques of this disclosure, the device 100 can include a feedback loop 108 having a clamp circuit 110. The clamp circuit 110 can monitor a voltage at an output node, such as at the source of the pass transistor 106. Then, after a fault is detected by the hot-swap controller 102, and in response to the monitored voltage at the output node exceeding a magnitude of a reference voltage, such as a voltage −VCLAMP in FIG. 4, the clamp circuit 110 can control a rate at which the pass transistor 106 turns OFF.

For example, the hot-swap controller 102 can include two current sources 112, 114 coupled together at node 116, which is coupled to the gate of the pass transistor, as shown in FIG. 4. The first current source 112, which can be a constant current source, can be coupled to the gate of the pass transistor 106 and can be configured to pull the gate of the FET down to turn the pass transistor OFF.

The second current source 114 can be coupled to the clamp circuit 110 and can be configured to decrease the rate at which the pass transistor 106 turns OFF in response to the monitored voltage at the output node exceeding the reference voltage, such as a negative voltage −VCLAMP in FIG. 4. That is, the amount of current to the node 116, which defines the current to the gate of the pass transistor 106, can be controlled by adding more current from the second current source 114 to the node 116, which can inhibit the fixed pulldown current from the first current source 112. In other words, the second current source 114 can pull up on the gate of the pass transistor 106 while the fixed pulldown current of the first current source 112 is pulling down on the gate, thereby inhibiting the fixed pulldown current.

The amount of current to the gate of the pass transistor 106 defines the rate of change of current (dI/dt) through the pass transistor 106, which is the same rate of change of current through the inductive load L1. The rate of change of current through the inductive load L1 defines the voltage at the output node, or the source terminal of the pass transistor 106 in FIG. 4.

Using the techniques of this disclosure, after a fault is detected by the hot-swap controller 102, and in response to the monitored voltage at the output node exceeding a magnitude of the reference voltage, such as a voltage −VCLAMP in FIG. 4, the clamp circuit 110 can control a rate at which the pass transistor 106 turns OFF. For example, in FIG. 4, the clamp circuit 110 can be configured to decrease the rate at which the pass transistor 106 turns OFF.

During a fault at the inductive load, the gate pulldown current returns to the source and can collapse the gate-to-source voltage (VGS) of the pass transistor 106, even as both go below the local ground potential. However, the effect of the feedback loop in FIG. 4 is that pulldown current from the current source 112 can be reduced if the voltage at the source goes below the reference voltage −VCLAMP. In this way, the clamp circuit 110 and the feedback loop 108 can control the pass transistor 106 to turn OFF slowly enough that the rate of change of current (dI/dt) experienced by the inductor L1 does not cause damaging voltage excursions at the source.

As mentioned above, the techniques of this disclosure can produce a response that de-energizes the inductor L1 as quickly as possible while limiting the negative voltage capability of the hot-swap controller. Compared to the other techniques, the techniques described in this disclosure can also allow the hot-swap controller to protect the system in the case of faults to a negative voltage without the requirement for a local low impedance point at a voltage below ground.

Figure 5:
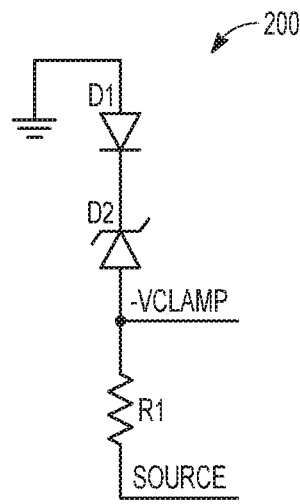
FIG. 5 is a non-limiting example of a circuit that can be used to generate a reference voltage that can be used with a clamping circuit.

FIG. 5 is a non-limiting example of a circuit that can be used to generate a reference voltage that can be used with a clamping circuit. As indicated above, the clamping circuit, such as the clamping circuit 110 of FIG. 4, can compare a voltage at the output node, such as the source of the pass transistor, to a reference voltage, such as the negative reference voltage −VCLAMP. To avoid using a negative supply, the circuit 200 in FIG. 5 can generate a negative reference voltage −VCLAMP from the output node, such as the source of the pass transistor. The reference voltage can be set as low as the capability of the device circuitry allows.

In the non-limiting example shown in FIG. 5, a diode D1 and a diode D2, e.g., a Zener diode, can be coupled back-to-back with the anode of the diode D1 coupled to a reference voltage, such as a ground potential, and the anode of the diode D2 coupled to a resistor R1. The other terminal of the resistor R1 can be coupled to the output node, e.g., the source of the pass transistor. In this manner, the negative reference voltage −VCLAMP can be generated at the node between the resistor R1 and the diode D2.

Figure 6:
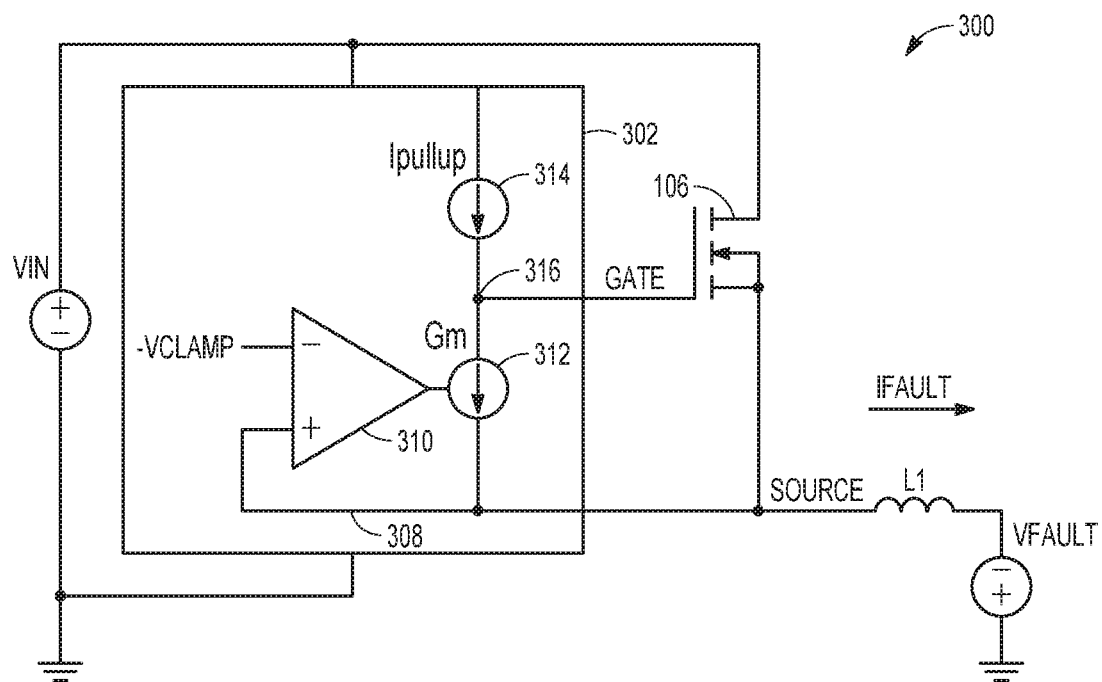
FIG. 6 is a simplified diagram of another example of a device having a feedback loop and coupled to an inductive load with a fault that can implement various techniques of this disclosure.

FIG. 6 is a simplified diagram of another example of a device having a feedback loop and coupled to an inductive load with a fault that can implement various techniques of this disclosure. Some of the components of the device 300 in FIG. 6 can be similar to the components of the device 100 in FIG. 4 and, for purposes of conciseness, will not be described again.

Like FIG. 1, the hot-swap controller 302 along with a current sense element, e.g., current sense element 15 of FIG. 1, can form part of a sensing circuit that is configured to couple to an input voltage VIN and measure a representation of current to the inductive load. Also like FIG. 1, the hot-swap controller 302 can include a control circuit configured to couple to the sensing circuit and the pass transistor 106 and control the pass transistor 106 to operate between ON and OFF states. For example, the hot-swap controller 302 can apply a control signal to the pass transistor 106, e.g., to the gate of the FET, in order to control a current flow to the load L1.

Similar to the device 100 of FIG. 4, the device 300 of FIG. 6 can include a feedback loop 308 and a clamp circuit 310. The clamp circuit 310 can monitor a voltage an output node, such as the source of the pass transistor 106. Then, after a fault is detected by the hot-swap controller 302, and in response to the monitored voltage at the output node exceeding a magnitude of a reference voltage, such as a negative voltage −VCLAMP in FIG. 6, the clamp circuit 310 can control a rate at which the pass transistor 106 turns OFF.

Like the device 100 in FIG. 4, the hot-swap controller 302 of FIG. 6 can include two current sources 312, 314 coupled together at node 316, and the node 316 can be coupled to the gate of the pass transistor 106. In contrast to FIG. 4, the first current source 314 can be a constant current source coupled to the gate of the pass transistor 106 and can be configured to pull the gate of the FET up to turn the pass transistor 106 ON.

The second current source 312 can be coupled to the clamp circuit 310 and can be configured to decrease the rate at which the first FET turns OFF in response to the monitored voltage at the output node exceeding the reference voltage, such as a negative voltage −VCLAMP. That is, the amount of current to the node 316, which defines the current to the gate of the pass transistor 106, can be controlled by using the second current source 312 to pull current away from the node 316, which can inhibit the fixed pullup current from the first current source 314. In other words, while the pullup current of the fixed current source 314 is pulling up on the gate, the second current source 312 can pull down on the gate of the pass transistor 106, thereby inhibiting the fixed pullup current.

The amount of current to the gate of the pass transistor 106 defines the rate of change of current (dI/dt) through the pass transistor 106, which is the same rate of change of current through the inductive load L1. The rate of change of current through the inductive load L1 defines the voltage at the output node, or the source terminal of the pass transistor 106 in FIG. 6.

Using the techniques of this disclosure, after a fault is detected by the hot-swap controller 302, and in response to the monitored voltage at the output node exceeding a magnitude of the reference voltage, such as a voltage −VCLAMP in FIG. 6, the clamp circuit 310 can control a rate at which the pass transistor 106 turns OFF. For example, in FIG. 6, the clamp circuit 310 can be configured to decrease the rate at which the pass transistor 106 turns OFF. The gate pulldown current returns to the source and can collapse the gate-to-source voltage VGS of the pass transistor 106, even as both go below the local ground potential. However, the effect of the feedback loop in FIG. 6 is that pullup current can be reduced if the voltage at the source goes below the reference voltage −VCLAMP. In this way, the clamp circuit and the feedback loop can control the pass transistor 106 to turn OFF slowly enough that the rate of change of current (dI/dt) experienced by the inductor L1 does not cause damaging voltage excursions at the source.

Figure 7:
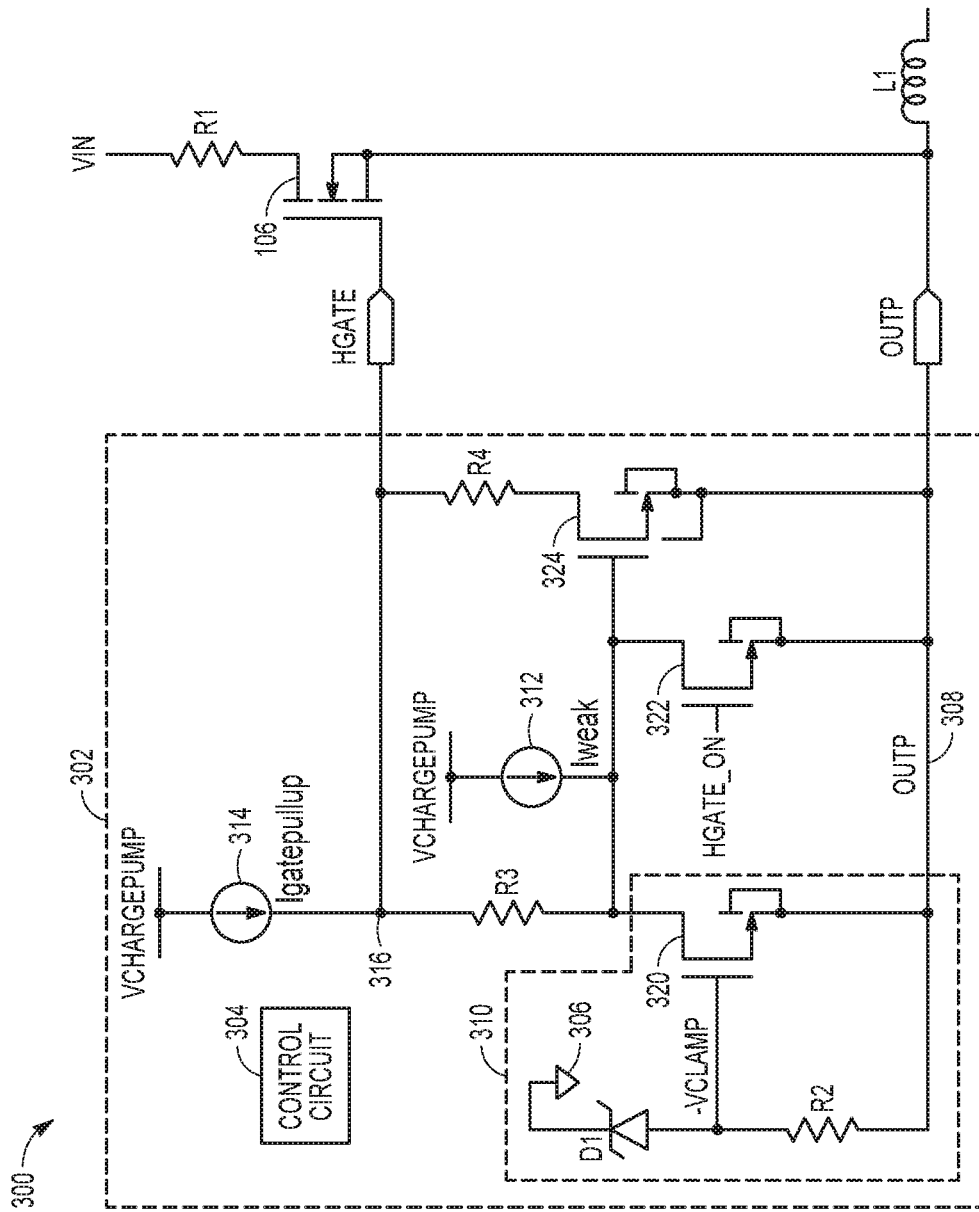
FIG. 7 is a more detailed diagram of the circuit shown in FIG. 6 of a device having a feedback loop and coupled to an inductive load with a fault that can implement various techniques of this disclosure.

FIG. 7 is a more detailed diagram of the circuit shown in FIG. 6 of a device having a feedback loop and coupled to an inductive load with a fault that can implement various techniques of this disclosure. The device 300 can include a current sense element R1 that forms part of a sensing circuit that is configured to couple to an input voltage VIN and measure a representation of current to the inductive load L1 coupled to an output node OUTP. The device 300 can include a control circuit 304 configured to couple to the sensing circuit and the pass transistor 106 and control the pass transistor 106 to operate between ON and OFF states. For example, the hot-swap controller 302 can apply a control signal to the pass transistor 106, e.g., to the gate of the FET, in order to control a current flow to the load L1.

The device 300 of FIG. 7 can include a feedback loop 308 and a clamp circuit 310 including a resistor R2 and one or more diodes that are represented by a single Zener diode D1 in FIG. 7 to generate a first reference voltage, such as a negative reference voltage −VCLAMP. The one or more diodes D1 need not include any Zener diodes. In some implementations, the diode(s) D1 can be formed by a stack of diodes that can be selected from Schottky diodes, diode-connected FETs, Zener diodes, and the like.

As seen in FIG. 7, the diode(s) D1 can be electrically coupled between the output node OUTP and a second reference voltage 306, such as, but not limited to, a ground potential. In addition, the clamp circuit 310 can include a FET 320, such as an N-type FET, coupled to the diode(s) D1.

The clamp circuit 310 can monitor a voltage at the output node OUTP. Then, after a fault is detected by the hot-swap controller 302, and in response to the monitored voltage at the output node OUTP exceeding a magnitude of a reference voltage, such as a negative voltage −VCLAMP, the clamp circuit 310 can control a rate at which the pass transistor 106 turns OFF. The FET 320 of the clamp circuit 310 is configured to turn ON in response to the monitored voltage at the output node exceeding the reference voltage.

During normal operation (no fault), the control circuit 304 can provide a signal HGATE_ON to a gate of a FET 322 to turn the FET 322 ON and pull the gate of a FET 324 down to turn the FET 324 OFF. As a result, the gate HGATE of the pass transistor 106 is pulled up by the fixed pullup current of the current source 314 that is coupled to a gate of the pass transistor 106 and, in response, the pass transistor 106 begins to turn ON and conduct current. In this manner, the control circuit 304 can control the pass transistor 106 to operate between ON and OFF states and allow the pass transistor 106 to conduct current.

When the pass transistor 106 is supposed to turn OFF, such as in response to a fault or a request from the control circuit to power down, the control circuit 304 can provide a signal HGATE_ON to the gate of the FET 322 to turn the FET 322 OFF (the HGATE_ON signal is low relative to the voltage at the output node OUTP). The current from the current source 312 coupled to the gate of the FET 324 and any current through the resistor R3 allows the gate voltage on the FET 324 to increase and the FET 324 begins to turn ON. In this manner, the FET 324 can turn ON in response to the sensing circuit detecting the fault at the inductive load, via the sense resistor R1, and can control the pass transistor 106 to turn OFF by pulling the gate HGATE of the pass transistor 106 down via a resistor R4.

At this point, the feedback loop and the clamp circuit of the device 300 can begin to operate and control the FET 324 so that it does not turn the pass transistor OFF too quickly. More particularly, in response to the voltage the output node OUTP exceeding a reference voltage, such as the negative reference voltage −VCLAMP at the gate of the FET 320, current can be pulled through the resistor R2 and turn the FET 320 ON. The drain of the FET 320 is coupled to the gate of the FET 324. If the FET 324 is on all the way, then it will pull down the gate of the pass transistor 106 too quickly. Using the techniques of this disclosure, as the FET 320 turns ON, it pulls down on the gate of the FET 324, which inhibits the pulldown of the gate of the pass transistor 106. Thus, the FET 320 turns ON, in response to the voltage at the output node exceeding the reference voltage of the clamp circuit, to inhibit the FET 324, which prevents the FET 324 from turning the pass transistor 106 OFF too quickly.

Using these techniques, the feedback loop can monitor the voltage at the output node OUTP relative to a reference voltage, such as the voltage −VCLAMP, and turn off the pass transistor 106 at a controlled rate to servo the output node OUTP to the reference voltage.

Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventor also contemplate examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A device for controlling a pass transistor between a power supply and an inductive load, the device comprising:
   a pin configured to couple to the pass transistor;
   a sensing circuit configured to couple to an input voltage and to measure a representation of current to the inductive load;
   a control circuit configured to couple to the sensing circuit and the pass transistor, the control circuit configured to control the pass transistor between ON and OFF states; and
   a clamp circuit configured to:
   monitor a voltage at an output node; and
   in response to the monitored voltage at the output node exceeding a magnitude of a reference voltage, control a rate at which the pass transistor turns OFF.

2. The device of claim 1, wherein the clamp circuit configured to control the rate at which the pass transistor turns OFF is configured to decrease the rate at which the pass transistor turns OFF.

3. The device of claim 1, comprising:
   a first transistor configured to:
      turn ON in response to the sensing circuit detecting a fault at the inductive load; and
      control the pass transistor to turn OFF; and
   wherein the clamp circuit includes a second transistor, the second transistor, coupled to the first transistor, the second transistor configured to:
   turn ON, in response to the voltage at the output node exceeding the reference voltage of the clamp circuit, to inhibit the first transistor.

4. The device of claim 1, wherein the reference voltage is a negative reference voltage generated by the clamp circuit.

5. The device of claim 4, wherein the clamp circuit includes at least one diode.

6. The device of claim 5, wherein the negative reference voltage is a first reference voltage, and wherein the at least one diode is electrically coupled between the output node and a second reference voltage.

7. The device of claim 6, wherein the pass transistor is a first field-effect transistor (FET), wherein the clamp circuit includes a second FET coupled to the at least one diode, wherein the second FET is configured to turn ON in response to the monitored voltage at the output node exceeding the reference voltage, and wherein the first FET is configured to turn ON in response to the second FET turning ON.

8. The device of claim 1, wherein the pass transistor is a first field-effect transistor (FET), the device comprising:
   a first current source coupled to a gate of the first FET and configured to pull the gate of the first FET up to turn the first FET ON; and
   a second current source coupled to the clamp circuit and configured to decrease the rate at which the first FET turns OFF in response to the monitored voltage at the output node exceeding the reference voltage.

9. The device of claim 1, wherein the pass transistor is a first field-effect transistor (FET), the device comprising:
   a first current source coupled to a gate of the first FET and configured to pull the gate of the first FET down to turn the first FET OFF;
   a second current source coupled to the clamp circuit and configured to decrease the rate at which the first FET turns OFF in response to the monitored voltage at the output node exceeding the reference voltage.

10. A method of controlling a pass transistor between a power supply and an inductive load, the method comprising:
    measuring a representation of a current to the inductive load;
    monitoring a voltage at an output node; and
    decreasing a rate at which the pass transistor turns OFF in response to detecting a fault at the inductive load using the representation of the current and in response to the monitored voltage at the output node exceeding a reference voltage.

11. The method of claim 10, comprising:
    generating the reference voltage using a clamp circuit including at least one diode.

12. The method of claim 11, wherein the reference voltage is a negative reference voltage.

13. The method of claim 11, wherein the pass transistor is a first field-effect transistor (FET), and wherein the clamp circuit includes a second FET coupled to a Zener diode, the method comprising:
- controlling the second FET to turn ON in response to the monitored voltage at the output node exceeding the reference voltage; and
- controlling the first FET to turn ON in response to the second FET turning ON.

14. The method of claim 13, wherein the pass transistor is a first field-effect transistor (FET), the method comprising:
- controlling the first FET to turn ON by pulling up a gate of the first FET using a first current source coupled to the gate of the first FET; and
- using a second current source coupled to the clamp circuit to decrease the rate at which the first FET turns OFF in response to the monitored voltage at the output node exceeding the reference voltage.

15. The method of claim 14, wherein the pass transistor is a first field-effect transistor (FET), the method comprising:
- in response to a sensing circuit detecting the fault at the inductive load, controlling a second FET to turn the first FET OFF, and
- wherein, in response to the monitored voltage at the output node exceeding the reference voltage, controlling the second current source to pull a gate of the second FET up to decrease the rate at which the first FET turns OFF.

16. A device for controlling a pass transistor between a power supply and an inductive load, the device comprising:
- means for monitoring a voltage at an output node; and
- means for decreasing a rate at which the pass transistor turns OFF in response to detecting a fault at the inductive load using a representation of a current to the inductive load and in response to the monitored voltage at the output node exceeding a reference voltage.

17. The device of claim 16, comprising:
means for generating the reference voltage.

18. The device of claim 16, comprising:
means for generating a negative reference voltage.

19. The device of claim 16, wherein the pass transistor is a first field-effect transistor (FET), the device comprising:
- a first means coupled to a gate of the first FET and configured to pull the gate of the first FET up to turn the first FET ON; and
- a second means coupled to a clamp circuit and configured to decrease the rate at which the first FET turns OFF in response to the monitored voltage at the output node exceeding the reference voltage.

20. The device of claim 16, wherein the pass transistor is a first field-effect transistor (FET), the device comprising:
- a first means coupled to a gate of the first FET and configured to pull the gate of the first FET down to turn the first FET OFF; and
- a second means coupled to a clamp circuit and configured to decrease the rate at which the first FET turns OFF in response to the monitored voltage at the output node exceeding the reference voltage.

* * * * *